United States Patent Office 3,781,434
Patented Dec. 25, 1973

3,781,434
METHODS OF PRODUCING ANTIARTHRITIC ACTIVITY USING 3-SUBSTITUTED PHENYL-2-THIO-1,3-THIAZANE-2,4-DIONE
Charles E. Berkoff, Huntingdon Valley, Blaine M. Sutton, Hatboro, and Donald T. Walz, Drexel Hill, Pa., assignors to Smithkline Corporation, Philadelphia, Pa.
No Drawing. Filed Sept. 17, 1971, Ser. No. 181,610
Int. Cl. A61k 27/00
U.S. Cl. 424—246     4 Claims

ABSTRACT OF THE DISCLOSURE

Pharmaceutical compositions having antiarthritic activity which comprise a 3-substituted phenyl-2-thio-1,3-thiazane-2,4-dione and methods of producing antiarthritic activity by administering internally said compositions.

---

This invention relates to novel pharmaceutical compositions having antiarthritic activity and to methods of producing antiarthritic activity by administering said compostions. More specifically, the compositions of this invention comprise a 3-substituted phenyl-2-thio-1,3-thiazane-2,4-dione as the active medicament.

The novel pharmaceutical compositions of this invention, in dosage unit form, comprise a nontoxic pharmaceutical carrier and a 3-substituted phenyl-2-thio-1,3-thiazane-2,4-dione of the following general structural formula:

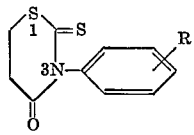

FORMULA I wherein R represents halogen such as chlorine, bromine or fluorine, preferably chlorine and in the 4'-position, or trifluoromethyl.

The compounds of Formula I above are either known or are prepared by the following synthetic method. An isothiocyanate of the formula

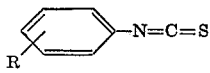

is condensed with β-mercaptopropionic acid in aqueous trimethylamine solution at room temperature to give a β-(thiocarbamoylthio)-propionic acid of the formula

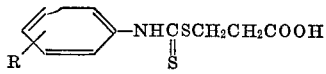

which is converted to the desired thiazane product by heating on a steam bath with acetic anhydride containing a few drops of sulfuric acid. The isothiocyanate starting materials are prepared, for example, by the reaction of the required aniline with thiophosgene either in aqueous solution or in chloroform. Reference may be made also to the U.S. Pat. 2,727,035 and Helv. Chim. Acta, 48, 1414 (1965).

The antiarthritic activity of the compositions of this invention is measured by the ability of the active medicament to inhibit adjuvant-induced polyarthritis in rats. The active medicaments of Formula I produce marked inhibition of the development of adjuvant arthritis in rats at daily oral doses of from 25 mg. to 50 mg. per kilogram of body weight. Adjuvant arthritis in rats is produced by a single injection of 0.75 mg. of *Mycobacterium butyricum* suspended in white paraffin (N.F.) into a hind-paw (left footpad). The injected leg becomes inflamed and reaches a maximum volume in 3–5 days (primary lesion). The animals exhibit a decrease in body weight gain during this initial period. Adjuvant arthritis (secondary phase) occurs after a delay of approximately 10 days and is characterized by inflammation of the non-injected sites (right hind leg), decrease in body weight gain and further increases in the volume of the injected hind leg. The compounds of Formula I administered in the doses described above beginning on the day of adjuvant injection and continuing for 17 days, thereafter, exclusive of days 4, 5, 11 and 12 protect the animals against development of both primary and secondary lesions of adjuvant arthritis.

The utility of the compositions of this invention is further enhanced by the failure of the compounds of Formula I to produce gastric erosions in rats at doses up to 200 mg./kg. and any observable effects in a rat dose range at 300 mg./kg. as demonstrated in standard pharmacological test procedures.

The pharmaceutical compositions of this invention are prepared in conventional dosage unit forms by incorporating an amount of a compound of Formula I sufficient to produce antiarthritic activity with a nontoxic pharmaceutical carrier according to accepted procedures. Preferably the compositions will contain a 1,3-thiazane of Formula I in an amount of from about 25 mg. to about 150 mg. per dosage unit.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olice oil, water and the like. Similarly the carrier or diluent can include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form or in the form of a troche or lozenge. The amount of solid carrier will vary widely but preferably will be from about 25 mg. to about 1 g. If a liquid carrier is used, the preparation will be in the form of a syrup, emulsion, soft gelatin capsule, sterile injectable liquid such as an ampule or an aqueous or nonaqueous liquid suspension.

The pharmaceutical dosage unit forms described hereinabove exclude simple non-sterile solutions of the active medicament in water or in common organic solvents and exclude simple aqueous suspensions of the active medicament in the absence of a suspending agent.

The method in accordance with this invention comprises administering internally to an animal organism a 1,3-thiazane of Formula I above, usually combined with a pharmaceutical carrier, in an amount sufficient to produce antiarthritic activity. The active medicament will be administered in a dosage unit, preferably in an amount of from about 25 mg. to about 150 mg. The route of administration may be orally or parenterally, the oral route being preferred. Advantageously equal oral doses will be administered three times daily with the daily dosage regimen being from about 75 mg. to about 450 mg. When the method described above is carried out antiarthritic activity is produced with a minimum of side effects.

The pharmaceutical preparations are made following the conventional techniques of the pharmaceutical chemist involving mixing, granulating and compressing when necessary or variously mixing and dissolving the ingredients as appropriate to the desired end product.

The following examples illustrate the preparation of compounds of Formula I and their incorporation into pharmaceutical compositions of this invention, and as such are not to be considered as limiting the invention set forth in the claims appended hereto.

PREPARATION

To a mixture of p-fluorophenylisothiocyanate (15.3 g., 0.1 m.) and β-mercaptopropionic acid (10.6 g., 0.1 m.), is added 100 ml. of 25% aqueous trimethylamine with stirring. Stirring is continued at room temperature for 20 minutes until the reaction mixture becomes homogeneous and is then made acidic with concentrated hydrochloric acid to give β-[N-(p-fluorophenyl)-thiocarbamoylthio]-propionic acid, M.P. 136–140° C.

In a similar manner,

β-[N-(p-chlorophenyl)-thiocarbamoylthio]-propionic acid,

β-[N-(m-trifluoromethylphenyl)-thiocarbamoylthio]-propionic acid,

β-[N-(m-chlorophenyl)-thiocarbamoylthio]-propionic acid,

β-[N-(o-chlorophenyl)-thiocarbamoylthio]-propionic acid, and

β-[N-(p-bromophenyl)-thiocarbamoylthio]-propionic acid are prepared.

Example 1

A mixture of β-[N-(p-fluorophenyl)-thiocarbamoylthio]-propionic acid (8.0 g., 0.031 m.), 30 ml. of acetic anhydride and 2–3 drops of concentrated sulfuric acid is heated on a steam bath for 10 minutes. The resulting homogeneous solution becomes solid on cooling in an ice bath. The product is separated by filtration, recrystallized from glacial acetic acid and boiled with water to get rid of traces of acetic acid yielding 3-(4'-fluorophenyl)-2-thio-1,3-thiazane-2,4-dione, M.P. 156–158° C.

Example 2

A mixture of β-[N-(p-chlorophenyl)-thiocarbamoylthio]-propionic acid (20 g., 0.072 m.), 80 ml. of acetic anhydride and 2–3 drops of concentrated sulfuric acid is heated on a steam bath for 30 minutes. The resulting homogeneous solution solidifies on cooling in an ice bath. The product is separated by filtration, recrystallized from glacial acetic acid and boiled with water to get rid of traces of acetic acid to give 3-(4'-chlorophenyl)-2-thio-1,3-thiazane-2,4-dione, M.P. 155–156° C.

In a similar manner are prepared, 3-(3'-chlorophenyl)-2-thio-1,3-thiazane-2,4-dione, M.P. 211–213° C., 3-(2'-chlorophenyl)-2-thio-1,3-thiazane-2,4-dione, M.P. 90–92° C., and 3-(4'-bromophenyl)-2-thio-1,3-thiazane-2,4-dione, M.P. 176–178° C.

Example 3

A mixture of β-[N-(m-trifluoromethylphenyl)thiocarbamoylthio]-propionic acid (6.0 g., 0.0194 m.), 25 ml. of acetic anhydride, and 2 drops of concentrated sulfuric acid is heated on a steam bath until the reaction mixture becomes a homogeneous solution (about 10–15 minutes). The product which comes out of the solution on cooling in an ice-bath is recrystallized from glacial acetic acid, acetic anhydride, and is then boiled with water to get rid of traces of acetic anhydride. This gives 3-(3'-trifluoromethylphenyl)-2-thio-1,3-thiazane-2,4-dione, M.P. 222–224° C.

Example 4

Ingredients: Mg./tablet
3 - (4' - chlorophenyl) - 2-thio-1,3-thiazane-2,4-dione _____ 25
Calcium sulfate, dihydrate _____ 150
Sucrose _____ 25
Starch _____ 15
Talc _____ 5
Stearic acid _____ 3

The sucrose, calcium sulfate and 3-(4'-chlorophenyl-2-thio-1,3-thiazane-2,4-dione are thoroughly mixed and granulated with hot 10% gelatin solution. The wetted mass is passed through #6 mesh screen directly onto drying trays. The granules are dried at 120° F. and passed through a #20 mesh screen, mixed with the starch, talc and stearic acid, and compressed into tablets.

Example 5

Ingredients: Mg./capsule
3 - (4' - chlorophenyl) - 2-thio-1,3-thiazane-2,4-dione _____ 150
Magnesium stearate _____ 5
Lactose _____ 300

The above ingredients are screened through a #40 mesh screen, mixed and filled into #0 hard gelatin capsules.

What is claimed is:

1. A method of treating arthritis which comprises administering internally to an animal in need of such treatment in an amount sufficient to produce antiarthritic activity a 3-substituted phenyl-2-thio-1,3-thiazane-2,4-dione of the formula:

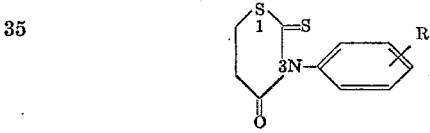

in which R is chlorine, bromine, fluorine or trifluoromethyl.

2. The method according to claim 1 in which R is chlorine.

3. The method according to claim 2 in which R is in the 4'-position.

4. The method according to claim 3 in which the active medicament is administered orally in a daily dosage regimen of from about 75 mg. to about 450 mg.

References Cited

UNITED STATES PATENTS 2,727,035   12/1955   Bowers et al. _____ 260—243

OTHER REFERENCES

Garraway, J. Chem. Soc. (1961), pp. 3733–5.

Cherbuliez et al., Helv. Chim. Acta 48, pp. 1414–1423 (1965).

ALBERT T. MEYERS, Primary Examiner

A. J. ROBINSON, Assistant Examiner